United States Patent [19]

Fujimoto

[11] Patent Number: 4,940,032

[45] Date of Patent: Jul. 10, 1990

[54] FUEL BOOSTING SYSTEM FOR INTERNAL COMBUSTION ENGINE

[75] Inventor: Hiroaki Fujimoto, Hamamatsu, Japan

[73] Assignee: Sanshin Kogyo Kabushiki Kaisha, Hamamatsu, Japan

[21] Appl. No.: 374,292

[22] Filed: Jun. 30, 1989

[30] Foreign Application Priority Data

Jul. 4, 1988 [JP] Japan ................. 63-166558

[51] Int. Cl.$^5$ ............................. F02D 43/00
[52] U.S. Cl. ................. 123/424; 123/179 G; 123/180 E; 123/180 P; 123/DIG. 5
[58] Field of Search ........ 123/179 BG, 179 G, 179 L, 123/180 E, 180 P, 424, 421, 491, DIG. 5

[56] References Cited

U.S. PATENT DOCUMENTS

| | | | |
|---|---|---|---|
| 3,749,070 | 7/1973 | Oishi et al. | 123/424 |
| 4,432,325 | 2/1984 | Auracher et al. | 123/424 |
| 4,528,963 | 7/1985 | Bessho et al. | 123/491 |
| 4,633,834 | 1/1987 | Takeuchi et al. | 123/424 |

FOREIGN PATENT DOCUMENTS 2612256  9/1988  France ........................ 123/424

Primary Examiner—Andrew M. Dolinar
Attorney, Agent, or Firm—Ernest A. Beutler

[57] ABSTRACT

An automatic fuel boosting system for supplying an optimum amount of fuel to an internal combustion engine based on engine temperature. This fuel boosting system includes a sensor for sensing if the engine temperature at the time of starting is below a predetermined value, an advance angle control circuit, responsive to the sensor, for advancing the ignition angle based on engine temperature, and a solenoid, responsive to the control circuit, for actuating a fuel boosting device so that an optimum amount of fuel is supplied to the intake manifold of the engine based on engine temperature, if the engine temperature is sensed to be below the predetermined value.

9 Claims, 5 Drawing Sheets

FUEL BOOSTING SYSTEM FOR INTERNAL COMBUSTION ENGINE

BACKGROUND OF THE INVENTION

This invention relates to a fuel boosting system in an internal combustion engine which is automatically activated based on engine temperature.

In many forms of engines, there is provided a manual device for supplying an increased amount of fuel to the engine at the time of starting when the engine temperature is low. However, since the additional fuel required when starting the engine varies depending on the atmospheric and engine temperatures, an optimum amount of fuel cannot be supplied by a manual device.

An object of this invention, therefore, is to provide an automatic fuel boosting system for supplying an optimum amount of fuel to the engine based on engine temperature without relying simply on manual boosting.

A further object of this invention is to provide an automatic fuel boosting system which simultaneously advances the ignition angle based on engine temperature.

The fuel boosting system should preferably include a sensor for sensing the engine temperature at the time of starting and an advance angle control circuit, which is responsive to the sensor, for advancing the ignition angle and for energizing a solenoid based on engine temperature. When the solenoid is energized, it actuates a fuel boosting device so that fuel is pumped into the engine intake manifold based on engine temperature.

SUMMARY OF THE INVENTION

An automatic fuel boosting system in an internal combustion engine which includes a sensor for sensing if the engine temperature at the time of starting is below a predetermined value, an advance angle control circuit, responsive to the sensor, for advancing the ignition angle based on the engine temperature, and a solenoid, responsive to the control circuit, for actuating a fuel boosting device so that an optimum amount of fuel is supplied to the intake manifold of the engine based on the engine temperature, if the engine temperature is sensed to be below the predetermined value.

The advance angle control circuit preferably includes an ignition angle advance circuit having a control timer. The control timer is responsive to the sensor. When the engine temperature is sensed to be below the predetermined value at the time of starting, the control timer and, accordingly, the control circuit are switched on for a particular period of time based on engine temperature. When the control timer is switched on, the ignition angle advance circuit advances the ignition angle a particular degree for a particular period of time based on the engine temperature. The switching on of the control timer simultaneously energizes a solenoid for a particular period of time based on the engine temperature. When the solenoid is energized it actuates the fuel boosting device, so that an optimum amount of fuel is supplied to the engine intake manifold for a particular period of time based on engine temperature. When the timer goes off, the ignition angle advance circuit performs ignition timing based on the throttle opening or engine rpm and the solenoid is no longer energized.

DETAILED DESCRIPTION OF THE PREFERRED EMBODIMENTS

Figure 1:
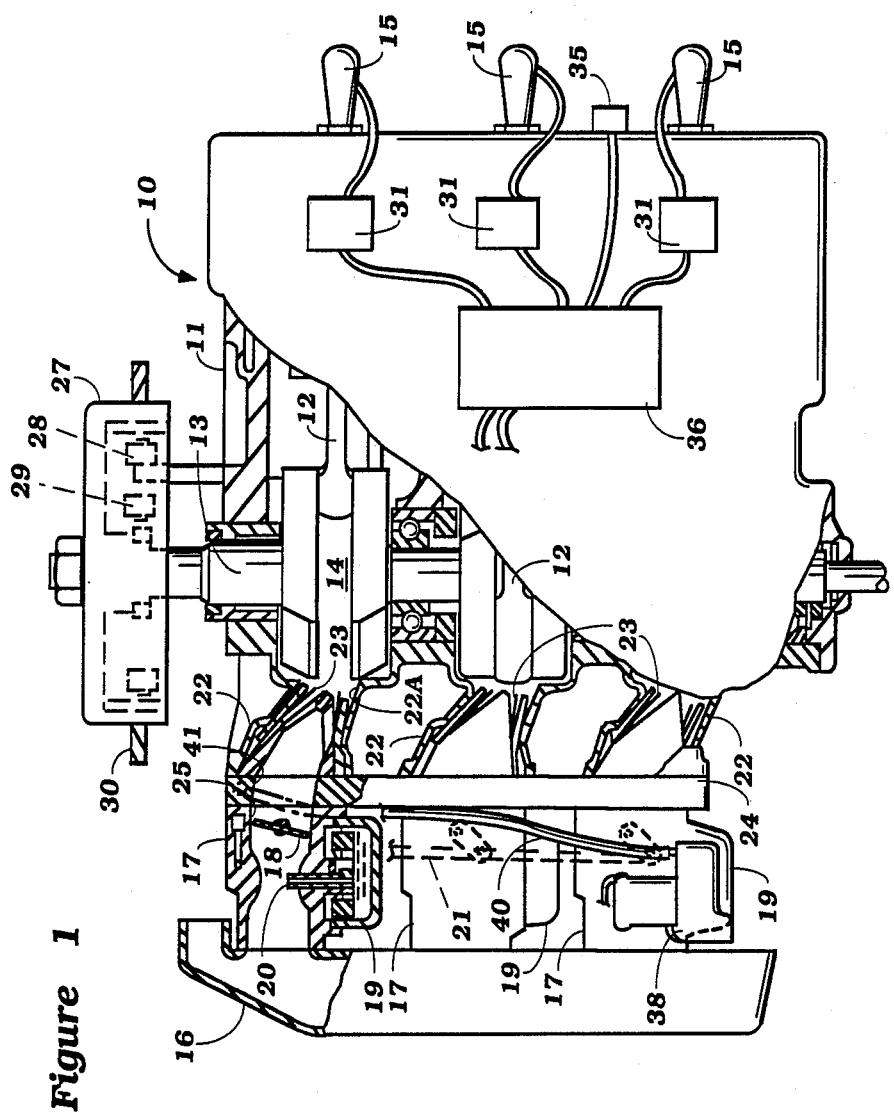
FIG. 1 is a side view of an internal combustion engine, with portions cut away and portions shown in section, to which the present invention is applied.

Referring first to FIG. 1, the internal combustion engine 10 is supported so that its output shaft rotates about a vertically extending axis. A drive shaft driven by the engine output shaft extends into a driveshaft housing (not shown). This drive shaft extends to a lower unit (not shown) so as to drive a propeller or other form of propulsion device in a known manner.

Referring now in detail to FIG. 1, the engine 10 is comprised of a cylinder block 11 in which three cylinder bores extend in a horizontal direction, as is conventional outboard motor practice. In the illustrated embodiment, the internal combustion engine is depicted as being of the three cylinder in line, crankcase compression, two-cycle type. It is to be understood, of course, that the invention may be utilized in conjunction with other types of engines than the two-cycle type and also engines having different numbers of cylinders or different cylinder configurations.

Pistons are supported for reciprocation within each of the cylinder bores and are connected by means of connecting rods 12 to a crankshaft 13. The crankshaft 13 is rotatably journaled in a crankcase formed by the cylinder block 11 and rotates about a generally vertically extending axis. The crankshaft 13 is connected to the output shaft which drives the drive shaft as aforenoted. As is conventional with two cycle internal combustion engines, the crankcase is formed with a plurality of individually sealed crankcase chambers 14, each associated with a respective cylinder bore.

A cylinder head is affixed to the cylinder block 11 in a known manner and defines three individual recesses, each of which cooperate with a respective cylinder bore and piston so as to define combustion chambers which vary in volume as the pistons reciprocate. Spark plugs 15 are mounted in the cylinder head with each of their gaps extending into a respective combustion chamber recess for a respective cylinder.

A fuel/air charge is delivered to these chambers by means of an induction and charge forming system. This induction and charge forming system includes an air inlet device 16 that draws air from within the protective cowling and delivers it to a plurality of carburetors 17. Each carburetor is comprised of a respective induction passage 25 in which a flow controlling throttle valve 18 is supported in a known manner. A fuel bowl 19 is maintained with a constant head of fuel by means of a float 55 (see FIG. 2) and an operating valve (not shown) and supplies fuel to a main discharge nozzle 20 positioned in the venturi section of the induction passage 25 of the carburetor 17 upstream of the throttle valve 18. In addition, the carburetors 17 are provided with discharge ports positioned downstream of the venturi sections and which control the flow of fuel/air mixture supplied to the engine in a known manner. The throttle valves 18 are all linked together by means of a linkage system 21 so that their movement will be synchronized.

The carburetors 17 deliver the fuel/air charge to an intake manifold 22 having individual manifold passages 22A, each of which discharges into a respective crankcase chamber 14. Reed type check valves 23 are positioned in each of the manifold passages 22A to preclude reverse flow through the manifold passages 22A, as is well known in this art.

A spacer plate 24 is interposed between the carburetors 17 and the manifold 22. The spacer plate 24 has individual passageways that provide communication between the carburetor induction passages 25 and the manifold passages 22A.

The fuel/air charge which is delivered to the crankcase chambers 14 by the carburetors 17 is transferred upon descent of the pistons into the combustion chambers by transfer or scavenge passages in a known manner. At the appropriate time, the spark plugs 15 are fired.

The firing power for the spark plugs 15 is derived from a magneto generator, which includes a flywheel magneto 27 that is affixed to the crankshaft 13 for rotation with it by a key and a nut. The flywheel magneto 27 carries a plurality of permanent magnets that cooperate with a charging coil 28 that is affixed to a boss of the cylinder block 11 in proximity thereto. The engine further includes a plurality of pulser coils 29, one for each cylinder. These pulser coils 29 are mounted on a mounting ring of the flywheel magneto 27 and cooperate with the magnets so as to provide signals when the crankshaft 13 is at specified crank angles.

Figure 3:
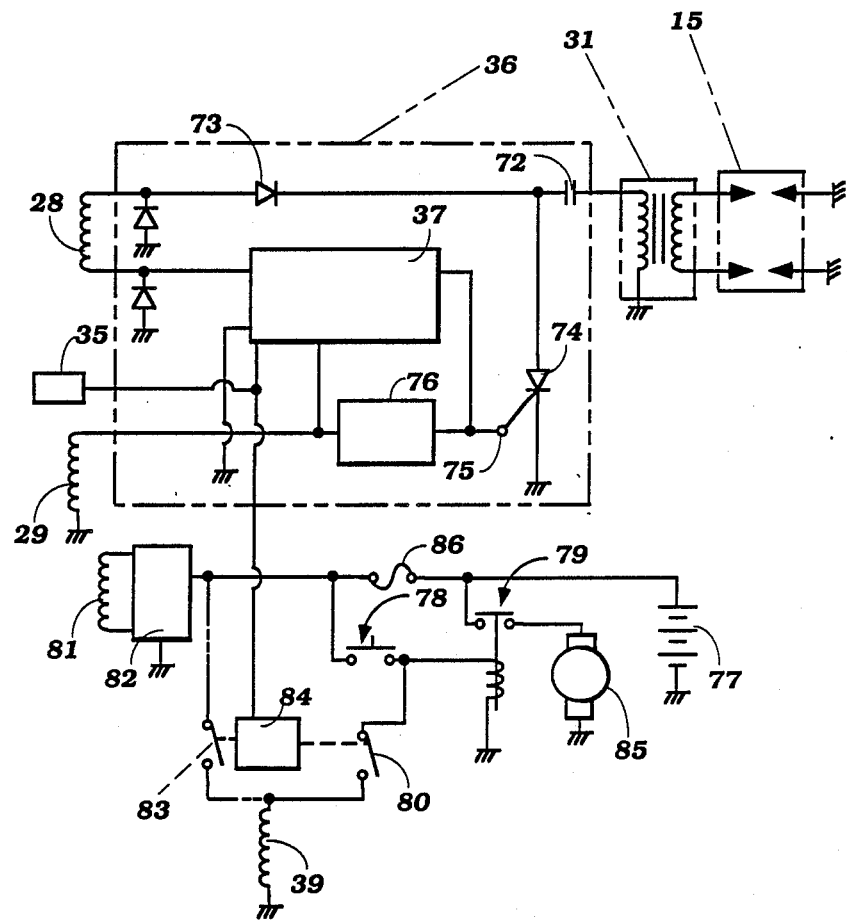
FIG. 3 is a circuit diagram of the ignition system embodying the present invention.

The engine 10 may also be provided with an electric starter including a starter gear 30 that is affixed to the flywheel magneto 27 and which is driven by a suitable starter motor 85 (see FIG. 3). A sensor coil may be associated with the teeth of the starter 85 for providing a signal that is indicative of the actual rotation angle of the crankshaft 13. The engine 10 also includes ignition coils 31, one associated with each spark plug 15.

In accordance with the invention there is provided a fuel boosting system for automatically supplying an optimum amount of fuel at the time of starting based on engine temperature. In addition, this fuel boosting system automatically advances the ignition angle and, accordingly, the timing of the firing of the spark plugs 15 at the time of starting based on engine temperature.

Figure 2:
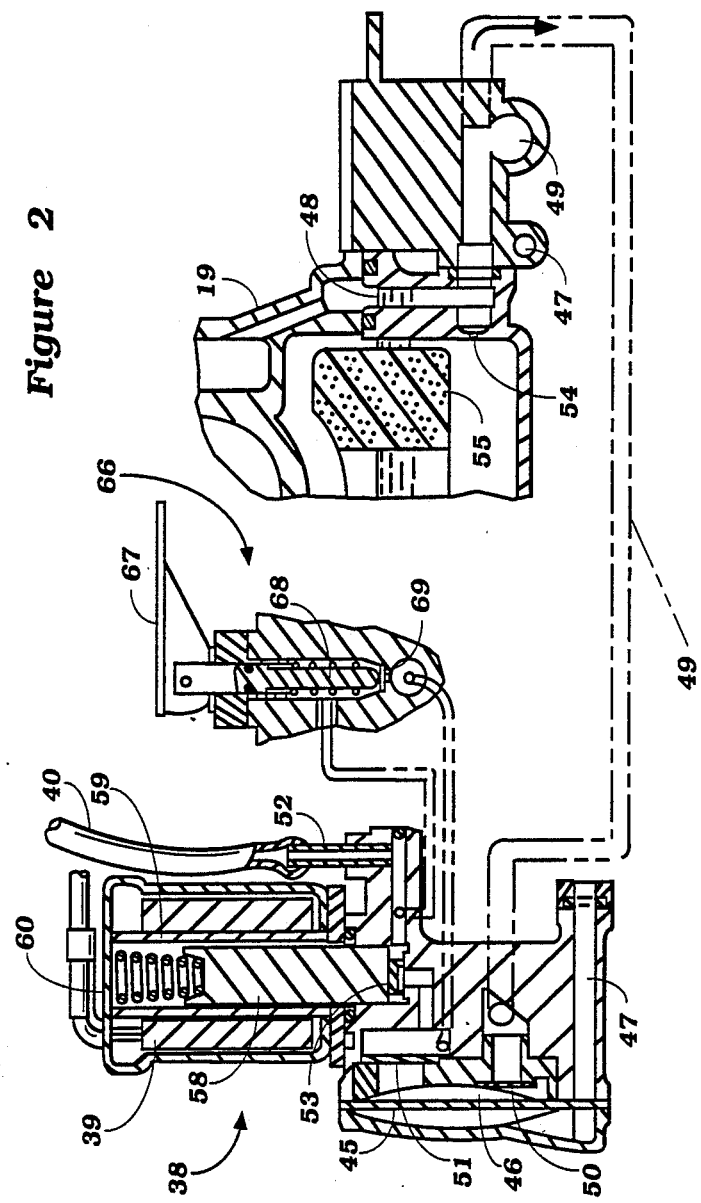
FIG. 2 is a detailed cross-sectional view of a fuel boosting device and solenoid, with parts broken away and parts shown in section.

This fuel boosting system includes a temperature sensor 35 for sensing if the temperature of the engine at the time of starting is below a predetemined value. The system also includes an advance angle control circuit 36 which has an ignition angle advance circuit 37 (see FIG. 3) for automatically advancing the timing on the basis of engine temperature and engine speed which is measured by the charging coil 28. The control circuit 36 also includes a control timer. The system further includes a fuel boosting device 38 for supplying an optimum amount of fuel to the engine and solenoid 39 for actuating the boosting device 38. This fuel is pumped by the boosting device 38 through a discharge conduit 40 to a suction passage 41 formed in the intake manifold 22. The details of the fuel boosting device 38 are illustrated in FIG. 2. The details of the ignition circuit including the sensor 35, the control circuit 36, including the advance circuit 37, and the solenoid 39 is illustrated in FIG. 3.

Referring now to FIG. 2, the fuel boosting device 38 includes a diaphragm pump 45 positioned within a pump chamber 46 that is actuated by pressure variations in one of the crankcase chambers 14 through a conduit 47. Fuel is delivered to the pump 45 from a well 48 formed in one of the carburetor bodies 17 and which receives fuel from its fuel bowl 19. The well 48 communicates with the pump 45 by means of a conduit shown schematically in FIG. 2 and indicated by reference numeral 49. A metering jet 54 controls the flow of fuel through the conduit 49. An inlet valve 50 is positioned between the conduit 49 and pump chamber 46 to control the flow of fuel to the pump 45. An outlet valve 51 between the pump chamber 46 and the discharge conduit 40 controls fuel flow out of the pump 45. The fuel is delivered to the intake manifold 22 by the discharge conduit 40, which is positioned externally of the engine 10, when the temperature of the engine 10 is below a predetemined value. The discharge conduit 40 communicates with the pump 45 through an opening 52 in the fuel boosting device 38. The fuel flow to the intake manifold 22 is controlled by means of a fuel control valve 53 which is responsive to the solenoid 39. The valve 53 is open when the solenoid 39 is energized and closed when the solenoid 39 is not energized.

The engine 10 also includes a float 55 and an operating valve which maintain a constant head of fuel in the fuel bowl 19.

In the preferred embodiment, the fuel boosting system includes a manual valve, designated generally by reference numeral 66 and shown schematically in FIG. 2. This manual valve 66 is used for supplying additional fuel at the time of starting when the engine temperature is low and when the fuel boosting device 38 is inoperative. The valve 66 communicates with the fuel boosting device 38 so that fuel can be supplied from the well 48 to the intake manifold 22 without flowing through the fuel control valve 53.

The valve 66 is comprised of a lever 67 for opening and closing the valve 66, and a core element 68. The manual valve 66 communicates with an inner chamber defined by the outlet valve 51 by an inlet conduit. A valve means 69 is positioned between the inlet conduit and the core 68 to control the flow of fuel from the boosting device 38 to the manual valve 66. An outlet conduit permits the valve 66 to communicate with the discharge conduit 40 downstream of the fuel control valve 53.

The fuel boosting device 38 further includes a core 58 and a bobbin 59, which, along with the solenoid 39, are enclosed by a case 60.

FIG. 3 illustrates a circuit diagram of the ignition system. This embodiment is depicted in conjunction with a two cylinder engine; however, as aforenoted the invention can be practiced in conjunction with engines having any number of cylinders or spark plugs.

The ignition system includes a magneto generator comprised of a charging coil 28 and pulser coils 29. An ignition coil 31 is associated with each spark plug 15 and has its secondary windings in circuit with the terminals of the spark plug 15 in a known manner. The charging coil 28 and pulser coils 29 output their signals to an advance angle control circuit indicated by reference numeral 36. This circuit includes a charging capacitor 72 that is charged from the charging coil 28 through a rectifying diode 73. As is well known, the charging capacitor 72 is charged during the rotation of the engine output shaft and crankshaft 13. At the appropriate crankshaft angle, as determined by the output from the pulser coils 29, a silicon-controlled rectifier (SCR) 74 and specifically its gate 75 is rendered conductive by means of a wave shaping circuit 76. When this occurs, the ignition coils 31 will have a voltage induced in their primary windings which is magnified in the secondary windings for firing the spark plugs 15 in a known manner. A diode is placed between the charging coil 28 and the rectifying diode 73 for providing a circuit during the negative half way of the charging coil 28.

The circuit is also provided with an arrangement for advancing the ignition angle and, accordingly, the firing of the spark plugs 15 based on engine temperature as sensed by the temperature sensor 35 at the time of starting. The temperature sensor 35 outputs its signals to the control circuit 36. If the engine temperature is below a predetermined value at the time of starting, a control timer of the control circuit 36 is switched on for a particular period of time based on engine temperature. The switching on of the control timer actuates the advance circuit 37 to advance the ignition angle and spark plug timing based on engine temperature.

The circuit further includes a battery 77. When the engine 10 is started, a starter switch 78, responsive to a relay switch 79, is closed. The closing of the starter switch 78 during starting permits current from the battery 77 to flow to a right switch 80 in circuit with the battery 77 and the solenoid 39, and which controls the flow of battery current to the solenoid 39. When the right switch 80 is closed current from the battery 77 energizes the solenoid 39.

The solenoid 39 can also be energized by current from a generating coil 81. A rectifier circuit 82 converts the AC input from the generating coil 81 into a DC waveform which flows to a left switch 83 in circuit with the generating coil 81 and the solenoid 39, and which controls the flow of current from the generating coil 81 to the solenoid 39.

A control circuit 84 controls the opening and closing of the right and left switches 80 and 83 and thus the energizing of the solenoid 39, based on the signals received from the temperature sensor 35.

The ignition circuit also includes a starter motor 85 in circuit with the battery 77. The relay switch 79 control current flow from the battery 77 to the starter motor 85 and also controls the position of the starter switch 78 such that the closing of the relay switch 79 causes the starter switch 78 to also close.

The ignition circuit also includes a fuse 86 in circuit with the generating coil 81 and the battery 77.

Figure 4:
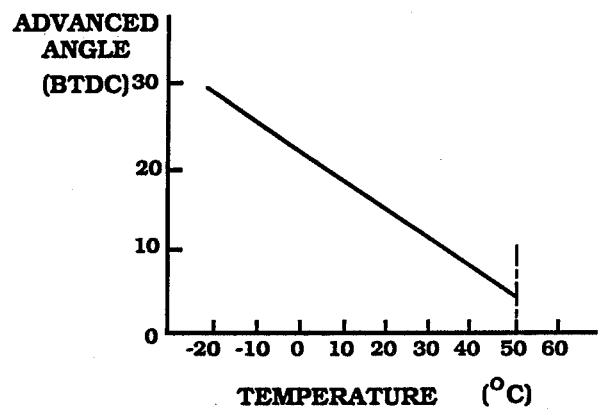
FIG. 4 is a graphical analysis of engine temperature relative to the advanced angle.
Figure 5:
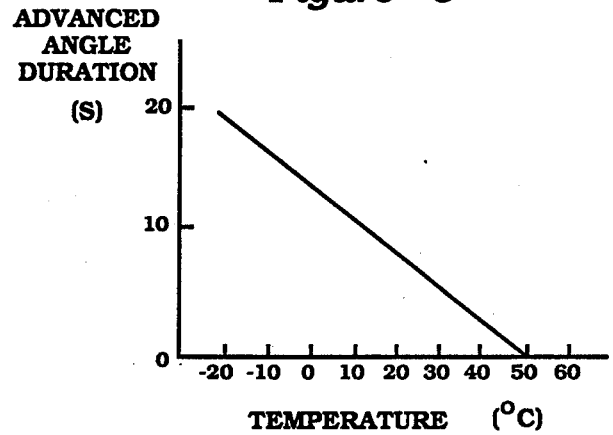
FIG. 5 is a graphical analysis of engine temperature relative to angle advance duration.
Figure 6:
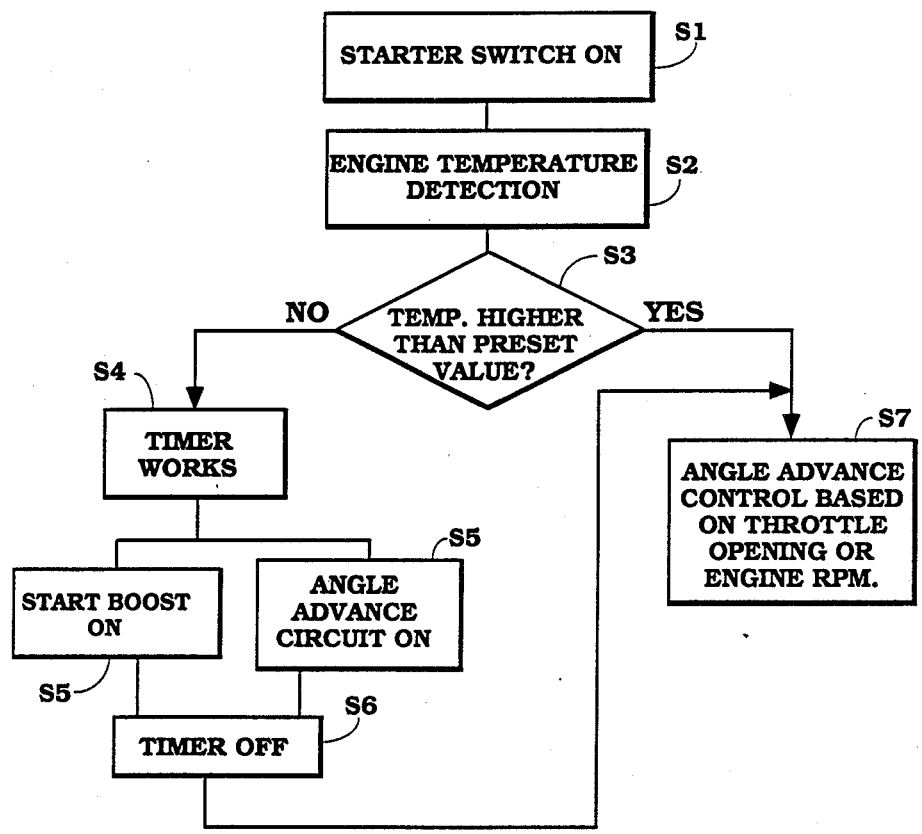
FIG. 6 is a block diagram showing an embodiment of the invention.

The preferred embodiment of the invention, is illustrated graphically and diagramatically in FIGS. 4, 5 and 6. If the sensor 35 detects the engine temperature to be below a predetermined value, 50 degress Celsius for example, when the starter switch 78 is in the on or closed position, the control timer is switched on for a particular period of time in accordance with FIG. 5. The actuation of the timer actuates the ignition angle advance circuit 37 to advance the ignition angle a particular degree before the top dead center mark on the crankshaft 13 and, accordingly, the spark plug timing based on the engine temperature as shown in FIG. 4 for a period of time as shown in FIG. 5. Simultaneous with the actuation of the advance circuit 37, the solenoid 39 is energized to open the valve 53 in the boosting device 38 for a period of time as shown in FIG. 5 so that the fuel boosting device 38 is truned on and fuel is pumped with the diaphragm pump 45 to the suction passage 41 formed in the engine intake manifold 22.

After the timer shuts off, the ignition angle is advanced based on throttle opening or engine rpm. Similarly, if the sensor 35 detects the engine temperature to above a predetermined value, 50 degrees Celsius as shown in FIGS. 4 and 5, at the time of starting, ignition angle advancement is performed according to throttle opening or engine rpm.

The foregoing descriptions represent merely exemplary embodiments of the invention. Various changes and modifications may be made without departing from the spirit and scope of the invention, as defined by the appended claims.

I claim:

1. In an internal combustion engine including a crankcase, a crankshaft rotatably journaled in said crankcase and an intake manifold, the improvement comprising an automatic fuel boosting system including means for sensing if the engine temperature at the time of starting is below a predetermined value, means for supplying an optimum amount of fuel to the engine intake manifold based on the engine temperature, means, responsive to said sensing means, for advancing the ignition angle based on the engine temperature and means, responsive to said advancing means, for actuating said supply means based on the engine temperature, if said engine temperature is sensed to be below the predetermined value.

2. In an engine as recited in claim 1, wherein said sensing means comprises a temperature sensor.

3. In an engine as recited in claim 2, wherein said supplying means comprises a fuel boosting device.

4. In an engine as recited in claim 3, wherein said actuating means comprises a solenoid.

5. In an engine as recited in claim 4, wherein said intake manifold includes a suction passage formed therein to which an optimum amount of fuel is supplied based on engine temperature.

6. In an engine as recited in claim 5, wherein said advancing means comprises an advance angle control circuit including an ignition angle advance circuit having a control timer, such that if the engine temperature is sensed to be below the predetermined value at the time of starting said control timer is switched on for a particular period of time based on the engine temperature, causing said ignition angle advance circuit to advance the ignition angle a particular degree for a particular period of time based on the engine temperature, and energizing said solenoid for a particular period of time based on the engine temperature, thereby actuating said fuel boosting device for supplying an optimum amount of fuel to the engine intake manifold for a particular period of time based on the engine temperature.

7. In an engine as recited in claim 6, wherein said ignition angle advance circuit advances the ignition angle a particular degree before a particular mark on said crankshaft.

8. In an engine as recited in claim 5, wherein an optimum amount of fuel is supplied to the suction passage formed in said manifold for a particular period of time based on the engine temperature.

9. In an engine as recited in claim 8, wherein said fuel boosting device comprises a fuel control valve and a diaphragm pump such that when said solenoid is energized, said valve is opened for a particular period of time based on the engine temperature so that fuel is pumped with said diaphragm pump to said suction passage formed in said intake manifold.

* * * * *